United States Patent
Libby et al.

(10) Patent No.: US 7,381,313 B2
(45) Date of Patent: Jun. 3, 2008

(54) INTEGRATED HYDROGEN PRODUCTION AND PROCESSING SYSTEM AND METHOD OF OPERATION

(75) Inventors: Cara Suzanne Libby, Saratoga Springs, NY (US); Richard Scott Bourgeois, Albany, NY (US)

(73) Assignee: General Electric Company, Niskayuna, NY (US)

(*) Notice: Subject to any disclaimer, the term of this patent is extended or adjusted under 35 U.S.C. 154(b) by 387 days.

(21) Appl. No.: 11/172,652

(22) Filed: Jun. 30, 2005

(65) Prior Publication Data

US 2007/0000789 A1    Jan. 4, 2007

(51) Int. Cl.
    *C25B 15/02* (2006.01)
(52) U.S. Cl. .............. 204/239; 204/241; 204/232; 204/237; 204/228.1; 204/228.2; 204/228.4; 204/228.5; 204/228.6; 204/274; 205/628; 205/629; 205/633; 205/634; 205/637
(58) Field of Classification Search ............ 205/628, 205/629, 633, 634, 637; 204/228.1, 228.2, 204/228.4, 228.5, 228.6, 230.2, 232, 237, 204/239, 241, 274
See application file for complete search history.

(56) References Cited

U.S. PATENT DOCUMENTS

| | | | |
|---|---|---|---|
| 4,288,301 A * | 9/1981 | Hart ..................... 205/555 |
| 4,599,867 A * | 7/1986 | Retallick ................. 62/46.2 |
| 6,080,290 A | 6/2000 | Stuart et al. ............ 204/269 |
| 6,254,741 B1 | 7/2001 | Stuart et al. |
| 2002/0100681 A1 | 8/2002 | Kirk et al. .............. 204/263 |
| 2004/0199295 A1* | 10/2004 | Fairlie et al. ............ 700/266 |
| 2005/0284154 A1* | 12/2005 | Peter et al. .............. 62/45.1 |

* cited by examiner

*Primary Examiner*—Bruce F. Bell
(74) *Attorney, Agent, or Firm*—Shawn A. McClintic; William E. Powell, II

(57) ABSTRACT

A method of operating an integrated hydrogen production and processing system is provided. The method includes operating an electrolyzer to produce hydrogen from water and utilizing heat generated from the electrolyzer to increase a temperature of an electrolyte in a first mode of operation. The method also includes heating the electrolyte in a second mode of operation by extracting heat from a hydrogen compressor to increase or maintain the temperature of the electrolyte during periods when electrolysis is not performed in the electrolyzer or during startup of the electrolyzer.

21 Claims, 4 Drawing Sheets

INTEGRATED HYDROGEN PRODUCTION AND PROCESSING SYSTEM AND METHOD OF OPERATION

BACKGROUND

The invention relates generally to hydrogen production and processing systems, and more particularly, to enhancement of performance of an integrated hydrogen production and processing system, that may include, but is not limited to, hydrogen purification, compression, and storage subsystems.

Various types of hydrogen production systems have been designed and are in use. For example, electrolyzer systems generate hydrogen through electrolysis of water. The hydrogen acts as an energy carrier, and can be converted back to electricity for power generation or distributed for use as a fuel. Typically, hydrogen generated from such systems is purified and compressed for storage before it is consumed in an end use system. Many view future hydrogen applications in terms of energy production with hydrogen being produced through electrolysis for direct use in producing power. For example, the end use system may be of a business or industrial nature where the stored hydrogen is used for power generation through hydrogen-powered internal combustion engines, fuel cells, and turbines. Moreover, the stored hydrogen may be distributed to a consumer for powering a vehicle or for use in certain residential applications such as cooking, and so forth.

In certain systems, an alkaline electrolyzer is used for hydrogen generation. Typically, an alkaline electrolyzer uses a liquid alkaline electrolyte such as potassium hydroxide or sodium hydroxide to facilitate electrolysis of water for generation of hydrogen. Further, the liquid electrolyte is required to maintain a desired operating temperature to ensure efficient operation of the electrolyzer. Moreover, during startup operation of the electrolyzer, the electrolyte is required to be heated to increase the temperature of the electrolyte to the desired operating temperature.

In initiation of operation of certain conventional electrolyzers, relatively long time delays are encountered for the electrolyte to reach the desired operating temperature, thereby resulting in long periods of inefficient operation of the electrolyzer at lower temperatures. In certain systems, an external heat source may be employed to heat the electrolyte to reach or maintain a desired operating temperature more quickly. However, adding an external heat source results in loss of overall efficiency of the system due to the addition of energy during this phase of operation. In certain other systems, the electrolyte is gradually heated solely through ohmic losses in the electrolyzer stack. In such systems, the heating of electrolyte results in substantially longer times to reach the desired steady-state temperature, thus reducing the overall efficiency of the system.

Accordingly, there is a need for an integrated hydrogen production and processing system that has enhanced performance achieved through utilizing heat from an internal heat source to heat the electrolyte in the hydrogen production system. It would also be advantageous to provide a hydrogen production and processing system that reduces the time to reach an optimum operating temperature of the electrolyte.

BRIEF DESCRIPTION

Briefly, according to one embodiment a method of operating an integrated hydrogen production and processing system is provided. The method includes operating an electrolyzer to produce hydrogen from water and utilizing heat generated from the electrolyzer to increase a temperature of an electrolyte in a first mode of operation. The method also includes heating the electrolyte in a second mode of operation by extracting heat from a hydrogen compressor to increase or maintain the temperature of the electrolyte during periods when electrolysis is not performed in the electrolyzer or during startup of the electrolyzer.

In another embodiment, an integrated hydrogen production and processing system is provided. The system includes an electrolyzer configured to produce a supply of hydrogen from water and electric power and a hydrogen compressor configured to compress hydrogen generated by the electrolyzer. The system also includes a heat exchanger configured to couple heat from compressed hydrogen from the compressor to an electrolyte to the electrolyzer for increasing or maintaining a temperature of the electrolyte and a circulation system configured to circulate the electrolyte through the heat exchanger for extracting heat from the compressed hydrogen.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
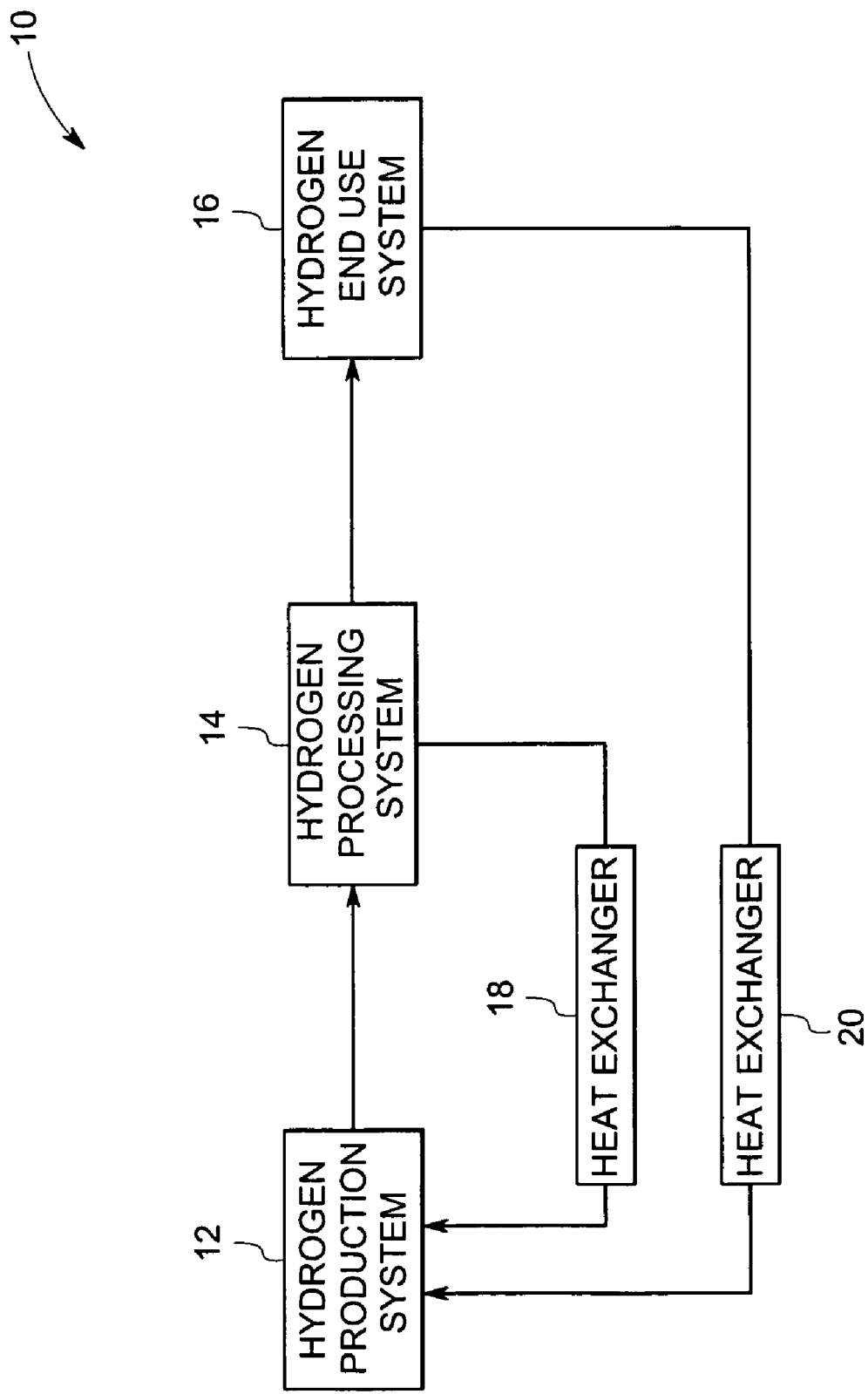
FIG. 1 is a block diagram representing an integrated hydrogen production and processing system, in accordance with an exemplary embodiment of the present technique.

Referring now to FIG. 1, an integrated hydrogen production and processing system 10 is illustrated. In the embodiment illustrated in FIG. 1, the integrated hydrogen production and processing system 10 includes a hydrogen production system 12 for production of hydrogen from water, and a hydrogen processing system 14 including hydrogen purification, compression, and storage sub-systems that are configured to purify, compress, and store hydrogen produced from the hydrogen production system 12. The integrated hydrogen production and processing system 10 also includes a hydrogen end use system 16 that receives stored hydrogen from the hydrogen processing system 14 for use in certain applications.

In operation, the hydrogen production system 12 generates hydrogen from electrolysis of water via an electrolyzer such as, but not limited to, an alkaline electrolyzer, a polymer electrolyte membrane (PEM) electrolyzer and a solid oxide electrolyzer. In the illustrated embodiment, the hydrogen production system 12 includes an alkaline electrolyzer that uses a liquid alkaline electrolyte such as potassium hydroxide or sodium hydroxide to facilitate electrolysis of water. Typically, the electrolyte is required to maintain a desired operating temperature for an efficient operation of the electrolyzer. For example, in an alkaline electrolyzer the required operating temperature for the electrolyte is about 80° C. In the illustrated embodiment, the integrated hydrogen production and processing system 10 includes a heat exchanger 18 configured to couple the heat generated from the hydrogen processing system 14 to the electrolyte in the hydrogen production system 12 to increase or maintain the desired operating temperature of the electrolyte. More specifically, the heat exchanger 18 couples the heat generated from a hydrogen compressor of the hydrogen processing system 14 to the electrolyte.

Further, the heat generated from the hydrogen end use system 16 may also be utilized to heat the electrolyte by transferring the heat to the electrolyte via a heat exchanger 20. As will be described in a greater detail below, heat dissipated from the hydrogen purification, compression, and storage sub-systems of the hydrogen processing system 14 and from the end use system 16 that would normally be lost or discarded to the surrounding environment is utilized to enhance the performance of the integrated hydrogen production and processing system 10.

Figure 2:
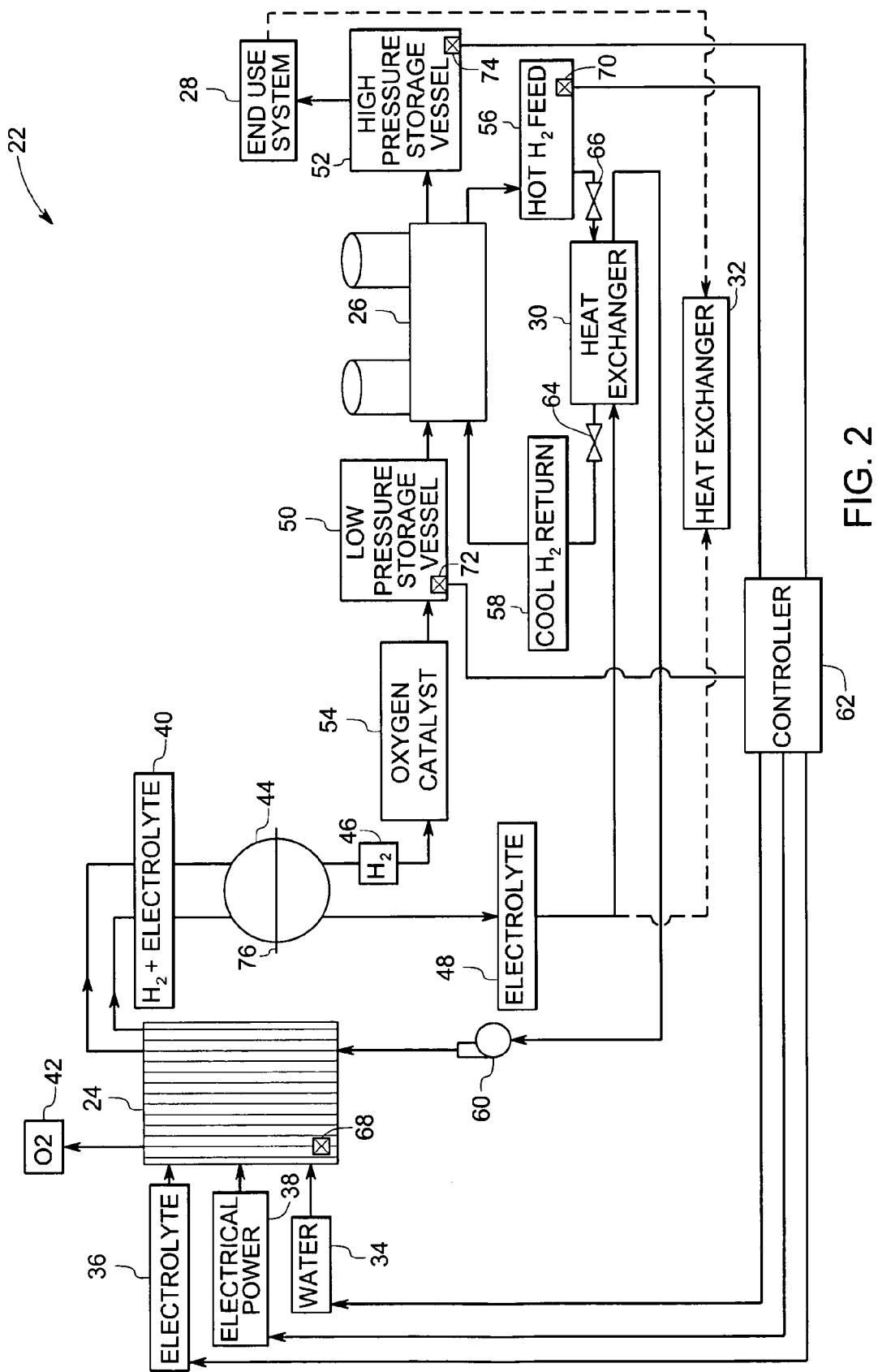
FIG. 2 is a diagrammatical representation of components of the integrated hydrogen production and processing system of FIG. 1, in accordance with an exemplary embodiment of the present technique.

FIG. 2 illustrates an exemplary configuration 22 of the integrated hydrogen production and processing system of FIG. 1. In a presently contemplated configuration, the integrated hydrogen production and processing system 22 includes an alkaline electrolyzer 24 for hydrogen generation and a hydrogen compressor 26 for compressing the hydrogen generated from the electrolyzer 24. Moreover, the generated hydrogen may be used by an end use system 28. For example, the generated hydrogen may be distributed for use in residential applications such as cooking, water heating and space heating. Alternatively, the generated hydrogen may be used for power generation through a gas turbine, a reciprocating engine or a fuel cell.

In addition, the integrated hydrogen production and processing system 22 includes a heat exchanger 30 that is operable to couple heat from the compressed hydrogen from the compressor 26 to an electrolyte in the hydrogen production system 24 for increasing or maintaining a temperature of the electrolyte. Similarly, a heat exchanger 32 may be employed to couple the heat from the end use system 28 to the electrolyte. Further, a circulation system including components such as valves, piping and a pump is employed to circulate the electrolyte through the heat exchangers 30 and 32 for extracting the heat from the compressed hydrogen and the end use system 28. In certain embodiments, the circulation system includes a thermally driven circulation system for circulating the electrolyte through the heat exchangers 30 and 32. An exemplary embodiment of the circulation system for circulating the electrolyte through the heat exchangers 30 and 32 will be described in detail below.

In operation, the electrolyzer 24 receives a supply of water 34. In certain embodiments, the water 34 may be de-ionized before it is supplied to the electrolyzer 24. In this embodiment, the water 34 is directed to a deionizer before entering the hydrogen production system 24. Further, the water may be added to the existing electrolyte solution intermittently or continuously to replace the water that has been consumed. Examples of electrolyte 36 include an alkaline solution, a polymer electrolyte membrane (PEM), and polybenzimidazole (PBI). However, other types of electrolytes may also be used.

Moreover, the electrolyzer 24 receives electrical power 38 from a power bus (not shown). The electrical power 38 from the power bus may be directed to a rectifier that is configured to convert alternating current (AC) from the power bus to direct current (DC) at a desired voltage and current for the operation of the electrolyzer 24. The electrolyzer 24 uses the electrical power 38 to split the de-ionized water for generation of hydrogen and oxygen 42. The oxygen 42 generated from the electrolyzer 24 may be vented into the atmosphere or stored in an oxygen storage vessel (not shown) and may be utilized for any suitable purposes. In certain embodiments, the generated oxygen may be compressed by a compressor (not shown) and stored in the oxygen storage vessel.

Moreover, the hydrogen gas is entrained in electrolyte mixture 40 as it is produced. The hydrogen-electrolyte mixture 40 is then supplied to a gas-liquid separator 44 coupled to the electrolyzer 24. Alternatively the hydrogen may be separated from the hydrogen-electrolyte mixture 40 within the electrolyzer 24. In the illustrated embodiment, the gas-liquid separator 44 separates the hydrogen-electrolyte mixture 40 into hydrogen 46 and electrolyte 48. The electrolyte 48 may be recycled to the electrolyzer 24. In this embodiment, an oxygen catalyst 54 disposed downstream of the gas-liquid separator 44 is configured to recombine any free oxygen in the hydrogen stream 46 to form water, which may be subsequently removed from the integrated hydrogen production and processing system 22. In certain embodiments hydrogen 46 from the gas-liquid separator 44 may be stored in a low pressure storage vessel 50 for utilization during periods of operation when electrolysis is not being performed or during startup of the electrolyzer 24. In addition, hydrogen 46 is compressed by the hydrogen compressor 26 and may be stored in a high pressure storage vessel 52. Subsequently, the stored hydrogen 46 may be dispensed as a product. Alternatively, the stored hydrogen 46 may be utilized by the end use system 28. For example, the stored hydrogen 46 may be utilized as a fuel for a gas turbine of a power generation system.

In certain embodiments, heat generated from the electrolyzer 24 may be utilized to heat the electrolyte 48 to increase the temperature of the electrolyte 48 during start-up. In another embodiment, the electrolyte 48 may be heated by extracting heat from the compressed hydrogen from the compressor 26 for increasing the temperature of the electrolyte 48 via the heat exchanger 30. As illustrated, the heat exchanger 30 receives hot hydrogen feed 56 from the compressor 26. In addition, the heat exchanger 30 receives the electrolyte 48 from the gas-liquid separator 44. The heat exchanger 30 facilitates the transfer of heat from the hot hydrogen feed 56 to the electrolyte 48 and returns cool hydrogen flow 58 to the compressor 26. Further, the heated electrolyte 48 is recirculated to the electrolyzer 24. In certain embodiments, a pump 60 may be employed to facilitate circulation of the electrolyte 48 through the electrolyzer 24. It should be noted that a similar heat circulation loop may be employed to couple the heat from the end use system 28 or the heat from the oxygen catalyst 54 to the electrolyte 48 via the heat exchanger 32. Further, heat generated from an oxygen compressor (not shown) for compressing the generated oxygen 42 may be transferred to the electrolyte 48 in a similar manner.

As described above, heat from different components of the integrated hydrogen production and processing system 22 may be utilized for heating the electrolyte 48 in the hydrogen production system 24 during different modes of operation of the integrated hydrogen production and processing system 22. In a presently contemplated configuration, a controller 62 is employed to control the operation of the different components of the system 22 for switching between various modes of operation. Specifically, the controller 62 controls operation of the circulation system including valves associated with the electrolyzer 24, compressor 26 and the heat exchangers 30 and 32. For example, valves 64 and 66 associated with the heat exchanger 30 may be controlled by the controller 62 to manage the heat circulation loop between the heat exchanger 30 and the compressor 26. Similarly, a valve (not shown) may be operated to control the flow of hydrogen from the compressor 26 to the high pressure storage vessel 52 for use in an application. Again, the operation of the valve may be controlled by the controller 62 based upon a predetermined input.

As will be appreciated by those skilled in the art, the controller 62 may control the operation of other valves (not shown for the ease of illustration) associated with components such as low pressure storage vessel 50, high pressure storage vessel 52 and so forth. In one embodiment, the controller 62 may include a single controller for controlling the different operations mentioned above. Alternatively, a hierarchy of controllers may be employed for monitoring and controlling the operation of different components of the integrated hydrogen production and processing system 22.

In certain embodiments, the controller 62 also controls the operation of the components of the system 22 based upon a sensed operating parameter. For example, a temperature sensor 68 may be coupled to the electrolyzer 24 to sense the temperature of the electrolyte 36. Similarly, a temperature sensor 70 may be coupled to measure the temperature of the hot hydrogen feed 56 from the compressor. In addition, pressure sensors 72 and 74 may be coupled to the low pressure storage vessel 50 and the high pressure storage vessel 52 respectively to measure the pressure of the hydrogen. In certain embodiments, if a low pressure storage vessel 50 does not exist, the pressure can be sensed in the hydrogen stream before it enters the compressor 26. Further, a liquid indicator controller 76 may be employed to measure a level of the hydrogen-electrolyte mixture in the gas-electrolyte separator 44. This controller 76 may be used to determine the flow rate of makeup water. The temperature and pressure measurements described above may be used by the controller 62 for monitoring and controlling the operation of the components of the system 22. In certain embodiments, the flow rate of the electrolyte 36 may be adjusted via the controller 62 to adjust the heat transfer rate to or from the electrolyte 36. Similarly, the supply of electrical power 38 may be adjusted through the controller 62 based upon a required hydrogen production volume. In certain embodiments, the controller 62 may have a built-in optimizer to determine the most favorable operating condition of the electrolyzer 24 to minimize power consumption. As will be appreciated by one skilled in the art, other measurements indicative of the operational status of the system 22 may be used by the controller 62 to regulate operation of the system 22.

Figure 3:
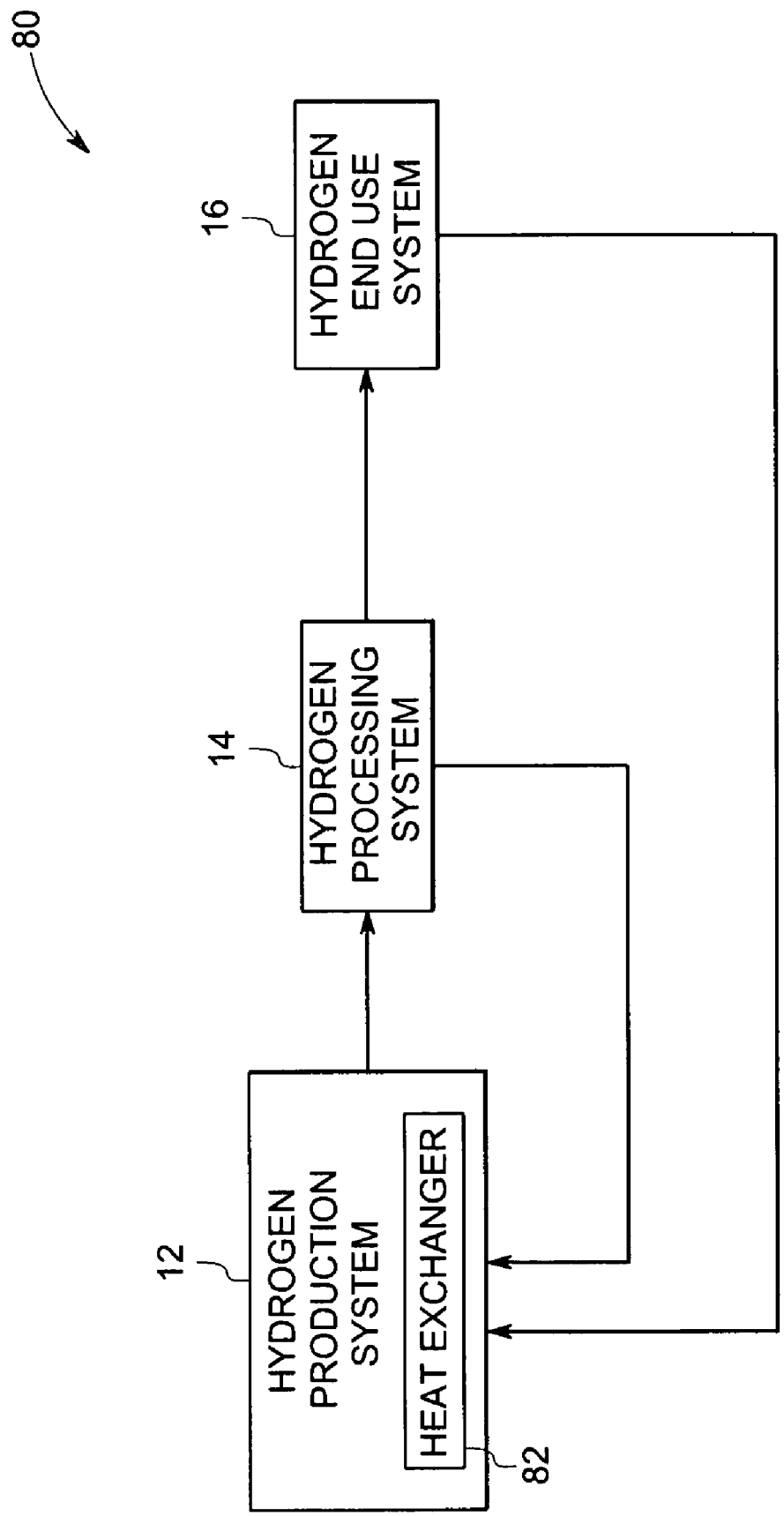
FIG. 3 is a block diagram representing an integrated hydrogen production and processing system, in accordance with another exemplary embodiment of the present technique.

FIG. 3 illustrates an integrated hydrogen production and processing system 80 in accordance with another exemplary embodiment of the present technique. In this embodiment, the hydrogen production and processing system 80 includes a heat exchanger 82 integrated with the hydrogen production system 12. In a present embodiment, the heat exchanger 82 may be disposed within the electrolyzer (see FIG. 2) and is operable to transfer the heat from the hydrogen processing system 14 or the hydrogen end use system 16 during different modes of operation that will be described in detail below. In certain embodiments, the heat exchanger 82 may include a liquid-to-liquid or a gas-to-liquid heat exchanger for coupling the heat from the hydrogen processing system 14 or the hydrogen end use system 16 to the electrolyte in the hydrogen production system 12.

As described above, based upon a required temperature of the electrolyte 48 in the electrolyzer 24, heat from the compressed hydrogen from the compressor 26 or the oxygen catalyst 54 or the end use system 28 may be coupled to the electrolyte 48 during different modes of operation that will be described below with reference to FIG. 4.

Figure 4:
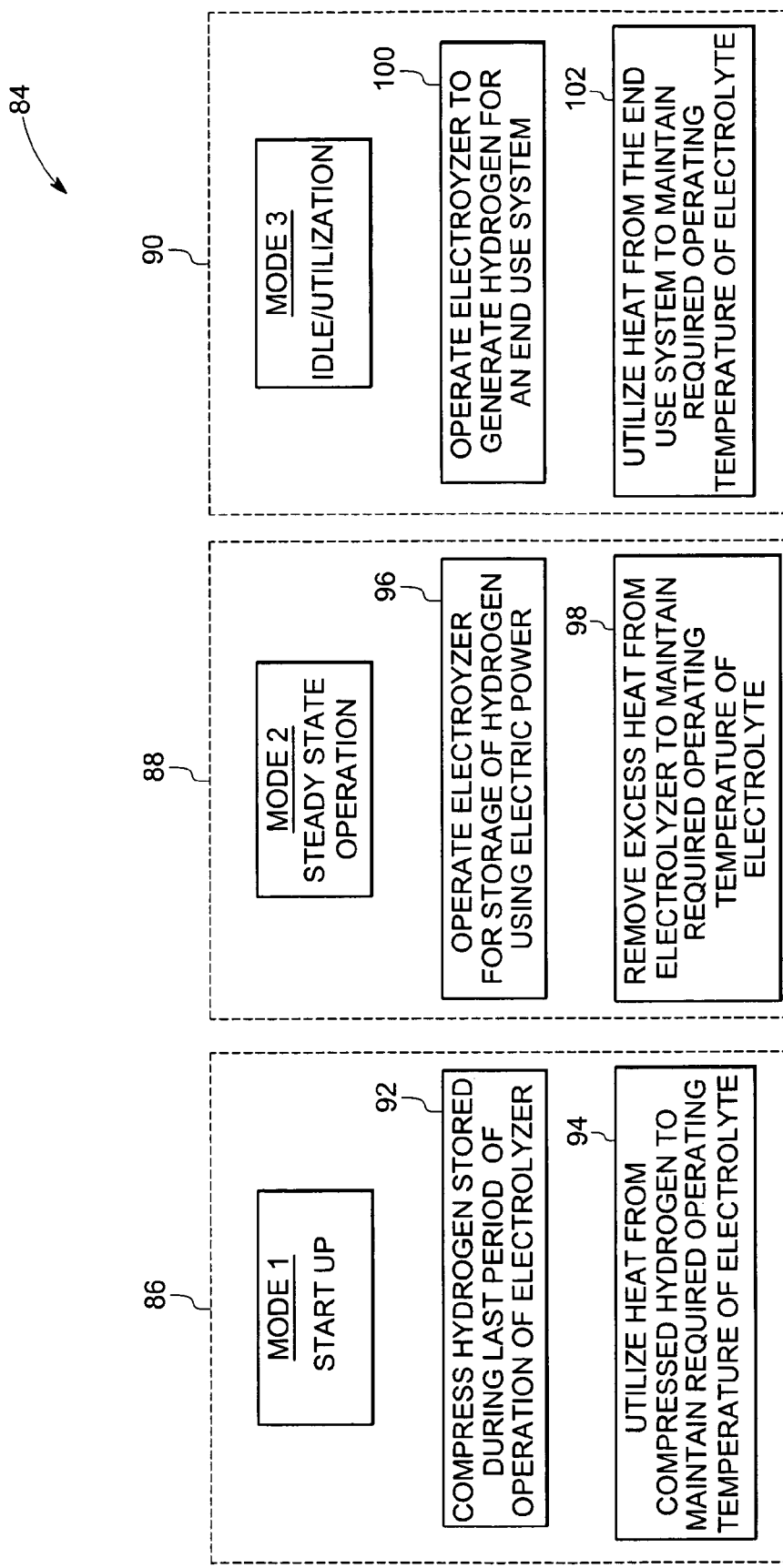
FIG. 4 is a diagrammatical representation of modes of operation for the integrated hydrogen production and processing system of FIGS. 1 and 2, in accordance with an exemplary embodiment of the present technique.

FIG. 4 represents exemplary modes 84 of operation for the integrated hydrogen production and processing system of FIGS. 1-3. The different modes of operation include a startup mode 86, a steady state mode 88 and an idle/utilization mode 90. However, other modes of operation of the integrated hydrogen production and processing system are within the scope of this application. During the startup mode 86, hydrogen stored during the previous period of operation of the electrolyzer is compressed via the hydrogen compressor (block 92). As noted above, the hydrogen generated by the electrolyzer during the previous period of operation may be stored in a low pressure storage vessel. Subsequently, during startup mode this stored hydrogen is compressed and heat from the compressed hydrogen is utilized to increase the temperature of the electrolyte (block 94) until it reaches the required operating temperature. Thus, heat from the compressed hydrogen is used to actively heat the electrolyte in the hydrogen production system. Again, as described above, a heat exchanger may be employed to couple the heat from the compressed hydrogen to the electrolyte. At the same time, excess heat from the electrolyzer will be used to heat the electrolyte during start up mode.

During the steady state mode 88, the electrolyzer is operated for production and storage of hydrogen, as represented by block 96. In this embodiment, the electrolyzer utilizes electrical power to generate hydrogen from water through electrolysis and the generated hydrogen is purified, compressed and is stored in the high pressure storage vessel. Further, as represented by block 98, excess heat from the electrolyzer may be removed from the electrolyte during steady state operation to maintain the required operating temperature of the electrolyte. A heat exchanger (not shown) transfers the excess heat to a cooling fluid.

During the utilization mode 90, an end use system consumes the stored hydrogen (block 100). The electrolyzer may or may not be operating during this mode of operation. If the end use system uses the stored hydrogen for power generation, then the electrolyzer will likely not operate in this mode. For example, a heat engine or a fuel cell may utilize the generated hydrogen to produce electricity. Other examples of end uses for hydrogen include generator cooling and water treatment applications. In these applications makeup hydrogen may be supplied on a more constant schedule such that the electrolyzer continues to operate while the end user is consuming the hydrogen. It should be noted that these applications may not require a compressor. Further, if the electrolyzer is not operating during the utilization mode, the heat from the end use system is utilized to maintain the required operating temperature of the electrolyte, as represented by block 102. In this embodiment, the heat from the end use system is coupled to the electrolyzer via a heat exchanger to heat the electrolyte. As described earlier, the heat exchanger may be an integral part of the electrolyzer or may be an external heat exchanger coupled to the end use system and to the electrolyzer. Similarly, during the idle mode, the stored hydrogen is compressed perhaps intermittently to produce heat, which is then transferred to the electrolyte to maintain the operating temperature. This reduces the startup time when the electrolyzer switches from idle mode to steady state operation.

It should be noted that the operation of the various components of the integrated hydrogen production and processing system may be controlled for switching between the various modes as described above. In particular, a controller is employed to control the operation of valves associated with each of the components to achieve a transient heating of the electrolyte. Typically, the heat generated from components of the integrated hydrogen production and processing system such as the compressor, the oxygen catalyst, the end use system and so forth may be sufficient to heat the electrolyte in the hydrogen production system to a desired operating temperature as illustrated by the following examples.

The following examples illustrate an exemplary energy availability study for an integrated hydrogen production and processing system. It should be noted that, these values are only meant to be a rough calculation for an exemplary integrated hydrogen production system and are not meant to confine the scope of the present invention.

EXAMPLE 1

In an exemplary 250 kW integrated hydrogen production and processing system hydrogen is produced at the rate of 5 kg/hr. The system operates for 16 hours a day with about 8 hours of downtime to produce 80 kg of hydrogen per day. During the downtime, the electrolyzer is switched off. As a result, the electrolyte temperature decreases at a rate dependent on multiple factors such as exposed surface area, pipe thickness and insulation. In this exemplary embodiment, assumptions were made for stack and system geometries.

In the integrated hydrogen production and processing system hydrogen generated by the electrolyzer is stored in a low pressure storage vessel. Further, a portion of the hydrogen is purified, compressed and stored in a high pressure storage vessel. As a result, the temperature of the hydrogen increases and is required to be cooled for storage in the high pressure storage vessel. Thus, for 80 kg of hydrogen produced in one day approximately 880 MJ of heat must be removed from the processing system. Assuming efficiency of the heat exchanger to be about 80%, approximately 700 MJ of heat will be available to heat the electrolyte. In an exemplary situation, where the electrolyte has cooled to about 25° C., approximately 59.4 MJ of heat is required to raise the electrolyte temperature to 80° C. Since about 700 MJ of heat is available, the exemplary system may be allowed to cool to ambient temperature before the next production period by using only the heat removed from hydrogen as it is compressed.

It should be noted that all of the heat from the compressed hydrogen is not available at a time as the compressor processes hydrogen at a rate of 5 kg/hr. In addition, the heating process is required to compensate for convective and radiative losses of the hydrogen production system to the surroundings that occurs at a rate of approximately 6 MJ/hr assuming that the electrolyzer is well insulated. The compressed hydrogen contributes about 44 MJ/hr accounting for the efficiency losses in the heat exchanger. Further, the low pressure storage vessel is designed to store about 2 kg of hydrogen. If the compressor begins processing of the hydrogen about 2 hours before the electrolyzer is scheduled to operate then the electrolyte may be heated from an initial temperature of 25° C. to an operating temperature of about 80° C. Thus, using the heat from the compressed hydrogen to heat the electrolyte before the electrolyzer begins operating reduces the time required to reach a required electrolyte operating temperature during startup mode.

EXAMPLE 2

In the exemplary hydrogen production and processing system of Example 1, the electrolyzer temperature is maintained during 8 hours of downtime by extracting heat from an end use system. Again, the electrolyte cools at a rate of about 6 MJ/hr based on convective and radiative cooling assumptions as discussed above. This corresponds to about 5 degree temperature drop per hour. Assuming that the hydrogen engine is about 40% efficient, approximately 60% of the energy consumed to operate the engine is available as waste heat. The 200 kW engine in this example rejects heat at a rate of about 58 MJ/hr assuming losses in the heat exchanger. As can be seen, the available heat from the engine exceeds the energy needed to maintain the operating temperature of the electrolyte. Therefore, by coupling the heat from the engine to a heat exchanger the electrolyte temperature can be maintained at a required operating temperature continuously during the downtime. Advantageously, the ability to maintain the electrolyte at a constant temperature is particularly useful in systems where thermal cycling is a concern.

The various aspects of the method described hereinabove have utility in integrated hydrogen production and processing systems, used for different applications. As noted above, excess heat from components of the integrated hydrogen production and processing system during various time periods may be utilized for heating the electrolyte in an electrolyzer for production of hydrogen. Thus, the heat from the components of the system may be advantageously used to enhance the efficiency of the integrated hydrogen production and processing system by minimizing external power input to the system. As will be appreciated by those skilled in the art, the utilization of the heat from internal sources of the integrated hydrogen production and processing system facilitates reduction in time for the electrolyte to reach an optimum operating temperature, thereby enhancing the capacity factor of the integrated hydrogen production and processing system and increasing the conversion efficiency of the hydrogen production process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating an integrated hydrogen production and processing system, comprising:
   operating an electrolyzer to produce hydrogen from water;
   utilizing heat generated from the electrolyzer to increase a temperature of an electrolyte in a first mode of operation; and
   heating the electrolyte in a second mode of operation by extracting heat from a hydrogen compressor to increase or maintain the temperature of the electrolyte during periods when electrolysis is not performed in the electrolyzer or during startup of the electrolyzer, further comprising recuperating heat from an end use system coupled to the integrated hydrogen production and processing system for maintaining a desired temperature of the electrolyte.

2. A method of operating an integrated hydrogen production and processing system, comprising:
   operating an electrolyzer to produce hydrogen from water;
   utilizing heat generated from the electrolyzer to increase or maintain a temperature of an electrolyte;
   coupling heat generated from a hydrogen compressor to the electrolyte to increase or maintain the temperature of the electrolyte during startup of the electrolyzer and during periods when electrolysis is not performed; and
   coupling heat from an end use system to the electrolyte for increasing or maintaining the temperature of the electrolyte during operation of the electrolyzer and during periods when electrolysis is not performed.

3. The method of claim 2, further comprising coupling heat generated from an oxygen catalyst to the electrolyte to increase or maintain the temperature of the electrolyte during startup of the electrolyzer.

4. The method of claim 3, wherein the heat generated from the hydrogen compressor, oxygen catalyst and the end use system is coupled to the electrolyte via a heat exchanger.

5. The method of claim 3, further comprising operating valves associated with the compressor, oxygen catalyst, heat exchanger and the end use system for transiently heating the electrolyte during different modes of operation.

6. The method of claim 2, further comprising coupling heat generated from a compressor for compressing oxygen generated from the electrolyzer to increase or maintain the temperature of the electrolyte during startup of the electrolyzer and during periods when electrolysis is not performed.

7. An integrated hydrogen production and processing system, comprising:
   an electrolyzer configured to produce a supply of hydrogen from water and electric power;
   a hydrogen compressor configured to compress hydrogen generated by the electrolyzer;
   a heat exchanger configured to couple heat from the hydrogen compressor to an electrolyte to the electrolyzer for increasing or maintaining a temperature of the electrolyte; and
   a circulation system configured to circulate the electrolyte though the heat exchanger for extracting heat from the hydrogen compressor wherein the heat exchanger is disposed within the electrolyzer.

8. The system of claim 7, wherein the electrolyzer comprises an alkaline electrolyzer, or a polymer electrolyte membrane (PEM) electrolyzer, or a polybenzimidazole (PBI) electrolyzer, or a solid oxide electrolyzer.

9. The system of claim 7, wherein the circulation system comprises a pump configured to facilitate circulation of the electrolyte though the electrolyzer.

10. The system of claim 7, further comprising a gas-liquid separator coupled to the electrolyzer, wherein the gas-liquid separator is configured to receive a hydrogen-electrolyte mixture from the electrolyzer and to separate the electrolyte and the hydrogen from the hydrogen-electrolyte mixture.

11. An integrated hydrogen production and processing system, comprising:
   an electrolyzer configured to produce a supply of hydrogen from water and electric power;
   a hydrogen compressor configured to compress hydrogen generated by the electrolyzer;
   a heat exchanger configured to couple heat from the hydrogen compressor to an electrolyte to the electrolyzer for increasing or maintaining a temperature of the electrolyte; and
   a circulation system configured to circulate the electrolyte though the heat exchanger for extracting heat from the hydrogen compressor,
   further comprising a gas-liquid separator coupled to the electrolyzer, wherein the gas-liquid separator is configured to receive a hydrogen-electrolyte mixture from the electrolyzer and to separate the electrolyte and the hydrogen from the hydrogen-electrolyte mixture, and
   further comprising an oxygen catalyst disposed downstream of the gas-liquid separator, the oxygen catalyst being configured to recombine any free oxygen in the hydrogen stream to form water and produce heat.

12. An integrated hydrogen production and processing system, comprising:
   an electrolyzer configured to produce a supply of hydrogen from water and electric power;
   a hydrogen compressor configured to compress hydrogen generated by the electrolyzer;
   a heat exchanger configured to couple heat from the hydrogen compressor to an electrolyte to the electrolyzer for increasing or maintaining a temperature of the electrolyte; and
   a circulation system configured to circulate the electrolyte though the heat exchanger for extracting heat from the hydrogen compressor,
   further comprising a low pressure storage vessel disposed upstream of the hydrogen compressor, the low pressure storage vessel being configured to store hydrogen generated from the electrolyzer for use during startup of the electrolyzer or while the electrolyzer is in idle mode.

13. The system of claim 12, further comprising a high pressure storage vessel disposed downstream of the hydrogen compressor, wherein the high pressure storage vessel is configured to store compressed hydrogen from the hydrogen compressor for use by an end use system.

14. The system of claim 12, wherein the circulation system comprises valves associated with each of the electrolyzer, hydrogen compressor and the heat exchanger for controlling the operation of the electrolyzer, hydrogen compressor and the heat exchanger.

15. The system of claim 14, further comprising a controller configured to control the operation of the valves associated with each of the electrolyzer, hydrogen compressor and the heat exchanger for transiently heating the electrolyte during different modes of operation.

16. The system of claim 15, wherein modes of operation comprise a startup mode, a steady state mode, and a utilization mode.

17. An integrated hydrogen production and processing system, comprising:
   an electrolyzer configured to produce a supply of hydrogen from water and electric power;
   a hydrogen compressor configured to compress hydrogen generated by the electrolyzer;
   a heat exchanger configured to couple heat from the hydrogen compressor to an electrolyte to the electrolyzer for increasing or maintaining a temperature of the electrolyte; and
   a circulation system configured to circulate the electrolyte though the heat exchanger for extracting heat from the hydrogen compressor,
   further comprising an end use system coupled to the integrated hydrogen production and processing system, wherein heat from the end use system is transferred to the electrolyzer for heating the electrolyte to maintain or increase the temperature of the electrolyte.

18. An integrated hydrogen production and processing system, comprising:
   an electrolyzer configured to produce a supply of hydrogen from water;
   a low pressure storage vessel configured to store hydrogen generated from the electrolyzer for use during startup of the electrolyzer or during an idle mode;
   a hydrogen compressor disposed downstream of the low pressure storage vessel, the hydrogen compressor being configured to compress hydrogen from the low pressure storage vessel; and
   a heat exchanger configured to couple heat from the compressed hydrogen to an electrolyte to the electrolyzer for increasing or maintaining a temperature of the electrolyte during startup of the electrolyzer or during idle mode.

19. The system of claim 18, further comprising a circulation system configured to circulate the electrolyte though the heat exchanger for extracting heat from the hydrogen compressor.

20. The system of claim 18, further comprising an end use system configured to receive hydrogen from the hydrogen compressor.

21. The system of claim 20, wherein the heat exchanger is configured to couple heat from the end use system to the electrolyte for increasing or maintaining the temperature of the electrolyte during a utilization mode.

* * * * *

UNITED STATES PATENT AND TRADEMARK OFFICE
CERTIFICATE OF CORRECTION

PATENT NO.        : 7,381,313 B2
APPLICATION NO. : 11/172652
DATED             : June 3, 2008
INVENTOR(S)       : Cara Suzanne Libby et al.

It is certified that error appears in the above-identified patent and that said Letters Patent is hereby corrected as shown below:

In claim 19, column 12, line 4, at the only instance thereof, replace "though" with -- through --.

Signed and Sealed this

Twenty-sixth Day of August, 2008

JON W. DUDAS
*Director of the United States Patent and Trademark Office*